United States Patent [19]
Araki et al.

[11] Patent Number: 5,881,170
[45] Date of Patent: Mar. 9, 1999

[54] CONTOUR EXTRACTION APPARATUS

[75] Inventors: Shoichi Araki, Osaka; Naokazu Yokoya, Ikoma, both of Japan

[73] Assignee: Matsushita Electric Industrial Co., Ltd., Osaka, Japan

[21] Appl. No.: 620,463

[22] Filed: Mar. 22, 1996

[30] Foreign Application Priority Data

Mar. 24, 1995 [JP] Japan ................................. 7-066566

[51] Int. Cl.⁶ ........................................................ G06K 9/48
[52] U.S. Cl. ......................... 382/199; 382/197; 382/107
[58] Field of Search .................................... 382/199, 107, 382/236, 242, 197

[56] References Cited

U.S. PATENT DOCUMENTS

| | | | |
|---|---|---|---|
| 4,783,833 | 11/1988 | Kawabata et al. | 382/107 |
| 5,131,058 | 7/1992 | Ting et al. | 382/199 |
| 5,471,535 | 11/1995 | Ikezawa et al. | 382/199 |
| 5,528,703 | 6/1996 | Lee | 382/199 |

OTHER PUBLICATIONS

M. Kass et al., "Snakes: Active Contour Models", *IEEE*, pp. 259–268 (1987).
S. Araki et al., "Splitting Active Contour Models Based On Crossing Detection and Its Application", *Technical Report of IEICE*, PRU95-21, (1995–05), pp. 1–8.
S. Araki et al., "A New Splitting Active Contour Model Based on Crossing Detection", *ACCV '95 Second Asian Conference on Computer Vision*, Dec. 5–8, Singapore, pp. II–346 to II–350.

*Primary Examiner*—Phuoc Tran
*Attorney, Agent, or Firm*—Ratner & Prestia

[57] ABSTRACT

The present invention provides a contour extraction apparatus which has an image storing section 1 for storing an image, a contour model storing section 2 for storing a contour model, a contour model transforming section 3 for transforming and shrinking the contour model according to a prescribed rule, a contour model intersection detecting section 4 for detecting a contact or intersection in the contour model, a contour model dividing section 5 for dividing the contour model into contour models based on the detected contact or intersection, and an extraction completion judging section 7 for judging whether or not extraction of the contour of the object has been completed. According to the contour extraction apparatus, even when there are objects whose contours are to be extracted, the contour of the each object can be extracted correctly by predesignating a region only once, or without predesignating a region at all, despite the presence of excessive noise or a discontinuity in the edge.

26 Claims, 15 Drawing Sheets

CONTOUR EXTRACTION APPARATUS

BACKGROUND OF THE INVENTION

1. Field of the Invention

The present invention relates to a contour extraction apparatus for extracting the contour of an object captured, for example, by a visual sensor such as a CCD or infrared camera.

2. Related Art of the Invention

As techniques for extracting the contour of an object from an image captured by a CCD camera or the like, and specifically as contour extraction techniques resistant to noise, SNAKES described in "JOHO SHORI (Information Processing) Vol.30, No.9, pp.1047–1057," etc. and the image processing apparatus disclosed in Japanese Patent Unexamined Application No.319051 are known.

According to these techniques, when a rough contour of an object to be extracted is given in advance, the accurate contour of the object can be obtained by minimizing an energy function defined by the contour and image features. These techniques can be applied to multimedia equipment used, for example, for interactive image editing.

However, the above prior art techniques have had the problem that a plurality of objects cannot be extracted unless the number of objects to be extracted is specified in advance.

In SNAKES, it is required that a rough contour of an object be given in advance as an initial contour. As a result, when the number of objects or the number of images to be processed is large, the processing burden involved in setting the initial contours becomes excessive.

Furthermore, SNAKES has had the shortcoming that it cannot be applied for applications where the number of objects contained in an image needs to be detected automatically, as in the detection of the number of intruders in the case of a security system or in the detection of the number of room occupants in air-conditioning control.

SUMMARY OF THE INVENTION

In view of the above situation, it is an object of the present invention to provide a contour extraction apparatus capable of extracting the contours of a plurality of objects in an image without predesignating the number of objects to be extracted and their rough contours.

It is another object of the invention to provide a contour extraction apparatus capable of extracting the contours of a plurality of objects alone that satisfy a predetermined criterion (for example, size, etc.) without predesignating the number of objects to be extracted and their rough contours.

It is a further object of the invention to provide a contour extraction apparatus capable of extracting the contours of a plurality of moving objects without predesignating the number of objects to be extracted and their rough contours.

It is a still further object of the invention to provide a contour extraction apparatus capable of distinguishing between moving and stationary objects without predesignating the number of objects to be extracted and their rough contours.

To achieve the above objects, the invention provides a contour extraction apparatus comprising: an image storing section for storing an image; a contour model storing section for storing a contour model that encloses at least one object contained in the image and that is used to extract a contour of the object; a contour model transforming section for transforming and shrinking the contour model according to a prescribed rule; a contour model intersection detecting section for detecting a contact or intersection in the contour model transformed and shrunk by the contour model transforming section when any portion of the contour model is contacting or intersecting any other portion thereof; a contour model dividing section for, when the contact or intersection has been detected by the contour model intersection detecting section, dividing the contour model into a plurality of contour models on the basis of the contact or intersection thus detected; and an extraction completion judging section for judging whether or not extraction of the contour of the object has been completed.

BRIEF DESCRIPTION OF THE DRAWINGS

These and other objects, advantages, features, and uses will become more apparent as the description proceeds, when considered with the accompanying drawings in which.

DESCRIPTION OF THE PREFERRED EMBODIMENTS (Embodiment 1)

Figure 1:
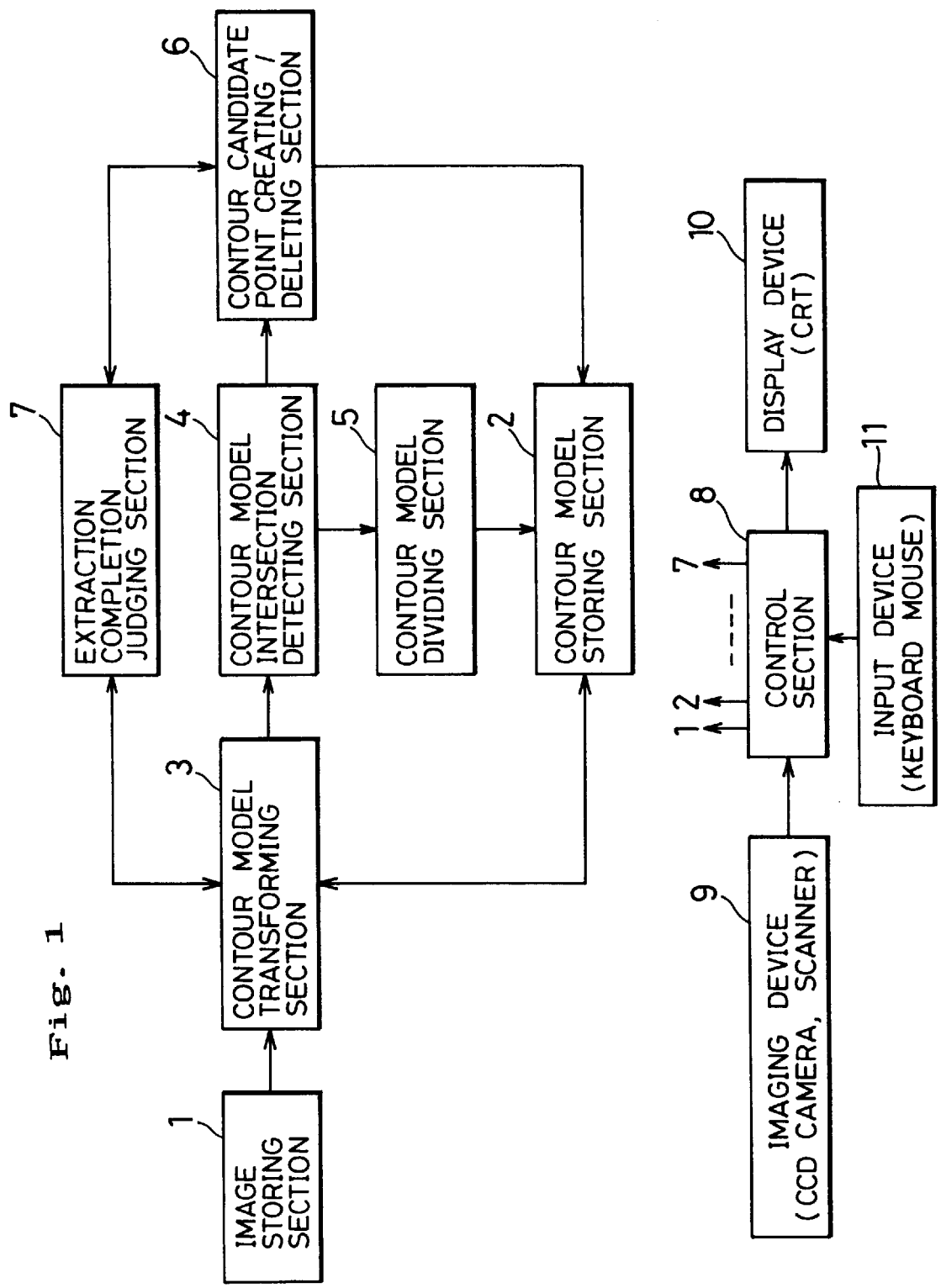
FIG. 1 is a block diagram showing a contour extraction apparatus according to a first embodiment of the present invention.

Referring now to FIG. 1, there is shown therein a block diagram showing a contour extraction apparatus according to a first embodiment of the present invention. Reference numeral 1 is an image storing section for storing an image captured from a scene containing an object; 2 is a contour model storing section for storing contour candidate points starting with which to search for points defining the contour of the object in the image stored in the image storing section 1; 3 is a contour model transforming section for moving, in accordance with a predetermined rule, the contour candidate points stored in the contour model storing section 2; 4 is a contour model intersection detecting section for detecting an intersection if an intersection occurs in a contour model constructed by connecting the contour candidate points in accordance with a predetermined rule; 5 is a contour model dividing section for dividing the contour model constructed of the contour candidate points into a plurality of parts if an intersection is detected therein by the contour model intersection detecting section 4; 6 is a contour candidate point creating/deleting section for newly adding or deleting a contour candidate point when no intersections were detected by the contour model intersection detecting section 4; and 7 is an extraction completion judging section for judging whether or not the extraction of the contour of the object from the image has been completed.

Further, reference numeral 8 is a control section, connected to each of the sections 1 to 7, for controlling the start and stop of the operation of each section or data transfer between them. The control section 8 is a computer comprising a memory, such as a ROM or RAM, and a CPU, and is connected via respective interfaces to an imaging device 9, such as a CCD camera or scanner, a display device 10 such as a CRT, and an input device 11 such as a keyboard or mouse, as shown in FIG. 1. Usually, the image storing section 1 and the contour model storing section 2 are each constructed from a RAM.

Figure 2:
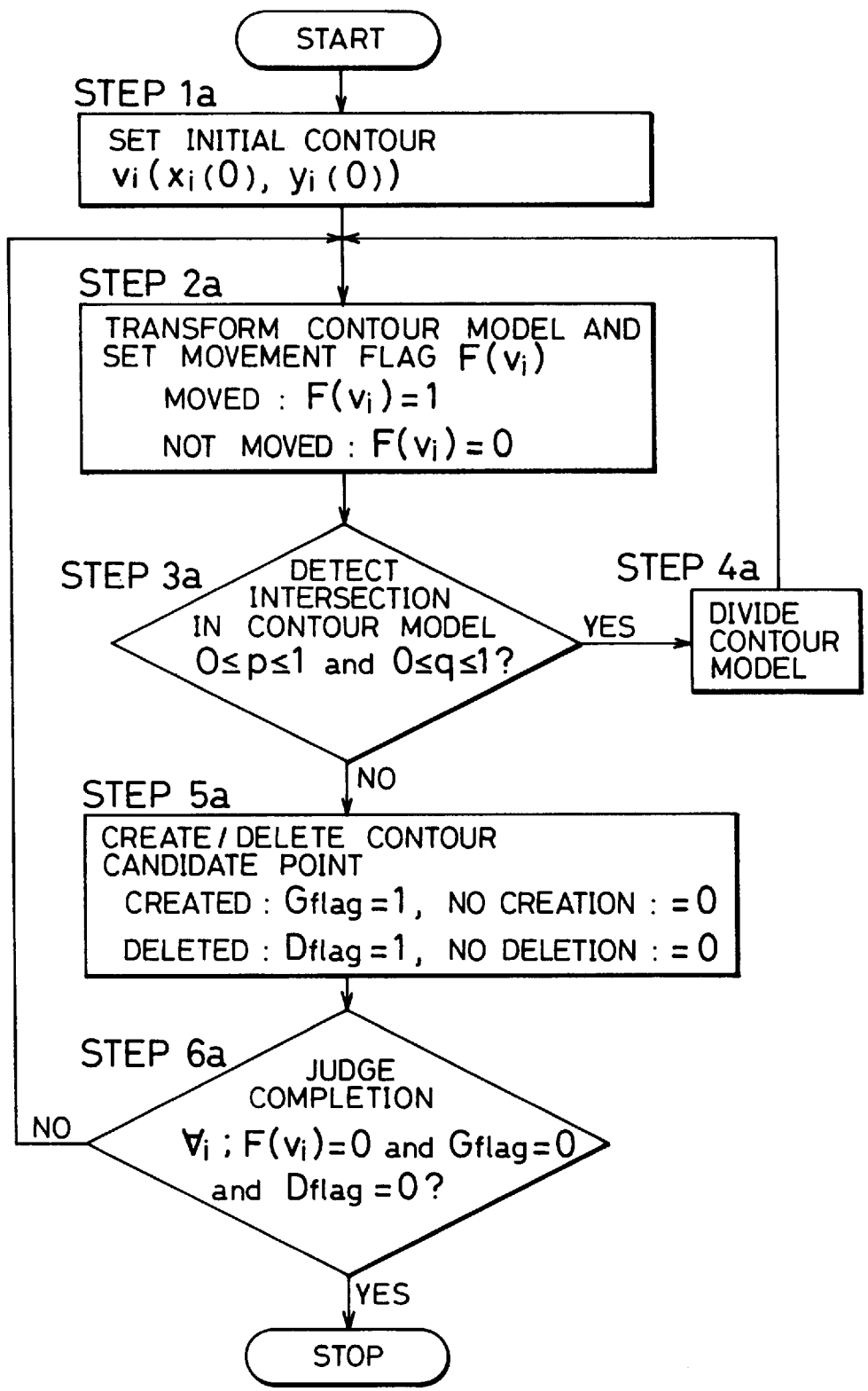
FIG. 2 is a flowchart illustrating a sequence of operations according to the first embodiment.
Figure 3:
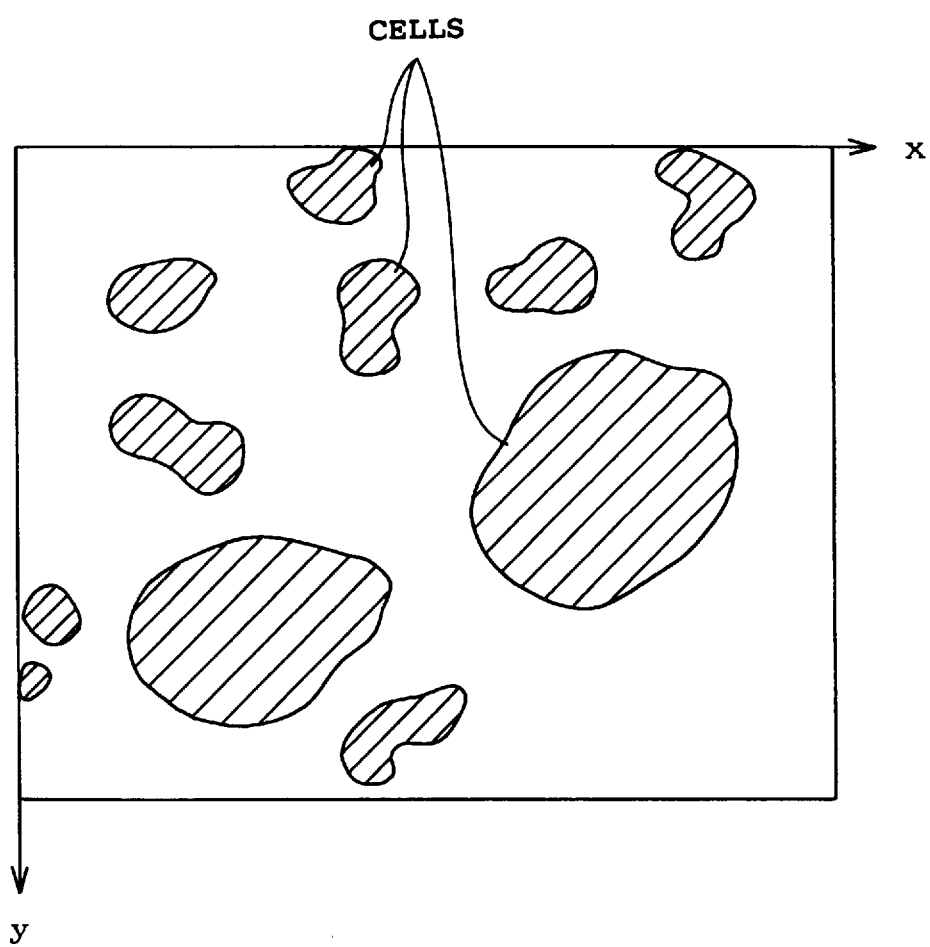
FIG. 3 is a diagram showing an example of an image containing objects (cells)

Next, the operation of this embodiment will be described. FIG. 2 is a flowchart illustrating the operation of the contour extraction apparatus according to this embodiment. To facilitate the understanding of the operation of this embodiment, an example is shown in FIG. 3 in which cell contours are extracted from a micrograph. This means that the invention can be applied to an automated system for a medical diagnosis of cancer cells, for example. An image of the micrograph of the cells is captured by the imaging device 9 such as a scanner and is stored in digital form in the image storing section 1. Data of the digitized image is stored with the brightness of each pixel represented, for example, by 8-bit data. The operation of this embodiment will be described below in sequence.

[STEP1a] Initial arrangement of contour candidate points

A number, n, of points forming a polygon (contour model) enclosing all the objects contained in the image stored in the image storing section 1 are stored in the contour model storing section 2 as initial contour candidate points $v_i(x_i(0), y_i(0))$ (i=1, 2, . . . , n), where i indicates the order of connection. An operator may work on the image displayed on the display device 10 by using the input device 11, such as a keyboard or mouse, to enter the initial contour candidate points for storage in the contour model storing section 2. Alternatively, the points by which the sides of a rectangle approximately equal in size to the image are divided into n equal parts may be prestored in the contour model storing section 2 as the initial contour candidate points.

[STEP2a] Transformation of the contour model

The contour model transforming section 3 moves the positions of all the contour candidate points once. The contour model constructed by connecting the contour candidate points is thus transformed. The contour model transforming section 3 moves each of the contour candidate points in a direction that minimizes the predefined energy $E_{snake}(v_i)$ of the contour model.

For example, the contour model transforming section 3 obtains the steepest descent vector $(-\partial E_{snake}/\partial x_i, -\partial E_{snake}/\partial y_i)$ of $E_{snake}(v_i)$ for each contour candidate point $v_i(x_i, y_i)$ (i=1, 2, . . . , n), and moves the contour candidate points in sequence along the contour or independently of each other in parallel fashion by using Equation 1 below.

Equation 1:

$$x_i(t+1) = x_i(t) - Kx(\partial E_{snake}/\partial x_i)$$

$$y_i(t+1) = y_i(t) - Ky(\partial E_{snake}/\partial y_i)$$

In Equation 1, t (t=0, 1, . . . ) indicates the number of movements of each of the contour candidate points. Further, Kx>0 and Ky>0 are constants for controlling the amount of movement of each of the contour candidate points.

However, if moving a contour candidate point is expected to result in an increase in the energy $E_{snake}(v_i)$, the contour model transforming section 3 does not move that contour candidate point.

The contour model transforming section 3 also stores a flag $F(v_i)$ (i=1, 2, . . . n) with each contour candidate point in the contour model storing section 2 to indicate whether the point has been moved or not. More specifically, the contour model transforming section 3 sets $F(v_i)=1$ for a contour candidate point that has been moved, and $F(v_i)=0$ for a contour candidate point that has not been moved.

Further, the energy $E_{snake(vi)}$ of the contour model may be defined, for example, as the sum of the energy terms expressed by Equations 2 to 6 below.

(1) $E_{spline}$ expressing the smoothness of the contour model

Equation 2:

$$E_{spline}(v_i) = (1/2) \sum_{i=1}^{n} [W_{sp1}|v_i - v_{i-1}|^2 + W_{sp2}|v_{i+1} - 2v_i + v_{i-1}|^2]$$

When every contour candidate point is so moved as to minimize Equation 2, the contour model shrinks.

(2) $E_{area}$ corresponding to the area of the closed region enclosed by the contour model Equation 3:

$$E_{area}(v_i) = (1/2) \sum_{i=1}^{n} W_{area}[x_i(y_{i+1} - y_i) - (x_{i+1} - x_i)y_i]$$

where $X_{n+1} = x_1$ and $y_{n+1} = y_1$.

When a contour candidate point is so moved as to minimize Equation 3, the contour candidate point moves in a direction perpendicular to the contour model. Therefore, by using $E_{area}$, the contour of an object having a concave shape can be extracted.

(3) $E_{dist}$ averaging the distance between contour candidate points

Equation 4:

$$E_{dist}(v_i) = (1/2) \sum_{i=1}^{n} W_{dist}|d_{av} - |v_i - v_{i-1}||^2$$

where $d_{av}$ denotes the average distance between contour candidate points.

(4) $E_{edge}$ expressing the magnitude of the slope of image brightness $I(v_i)$ Equation 5:

$$E_{edge}(v_i) = -(1/2) \sum_{i=1}^{n} W_{edge}|\nabla I(v_i)|^2$$

$$= -(1/2) \sum_{i=1}^{n} W_{edge}[(\partial I(v_i)/\partial x_i)^2 + (\partial I(v_i)/y_i)^2]$$

When a contour candidate point is so moved as to minimize Equation 5, the contour candidate point moves in a direction that increases the slope of the brightness, that is, toward the contour of the object.

(5) $E_{intens}$ expressing image brightness value
Expression 6:

$$E_{intens}(v_i) = \sum_{i=1}^{n} W_{intens}I(v_i)$$

When a contour candidate point is so moved as to minimize Equation 6, the contour candidate point moves in a direction that reduces the brightness (darkens) when $W_{intens}>0$, and moves in a direction that increases the brightness (brightens) when $W_{intens}<0$.

In Equations 2 to 6, $W_{sp1}$, $W_{sp2}$, $W_{area}$, $W_{dist}$, $W_{edge}$, and $W_{intens}$ are the weighting factors for the respective energy terms.

If the contour model is transformed in such a manner as to minimize the energy $E_{snake}(v_i)$ of the contour model, which is the sum of the energy terms in Equations 2 to 6, the contour model shrinks, but the shrinking stops, finally reaching a point where vectors by the energy terms in Equations 2 to 6 for moving the contour candidate points become balanced at the contour portion of the object. The contour model consisting of the contour candidate points in this state is extracted as the contour of the object.

[STEP3a] Detection of an intersection in the contour model

Given the contour model shaped in the form of a polygon constructed of the contour candidate points connected according to the prescribed order of connection, the contour model intersection detecting section 4 detects whether or not any one side of the polygon is contacting or intersecting any other side thereof, excepting pairs of adjoining sides. When each contour candidate point is moved on a pixel-by-pixel basis, in most cases one or the other of the ends of a side is detected touching some other side (see FIG. 4).

For example, the contour model intersection detecting section 4 may be configured to detect a point of contact or intersection in the following manner.

If it is assumed that a line segment $v_i v_{i+1}$ and a line segment $v_j v_{j+1}$ of the contour model have a point of intersection, real numbers p ($0 \leq p \leq 1$) and q ($0 \leq q \leq 1$) that satisfy Equation 7 below exist.

Equation 7:

$$p(v_{i+1}-v_i)+v_i=q(v_{j+1}-v_j)+v_j$$

Equation 7 is simultaneous equations in p and q, and has a solution when the determinant det calculated as Equation 8 below is not 0.

Equation 8:

$$det=(x_i-x_{i+1})(y_{j+1}-y_j)-(x_{j+1}-x_j)(y_i-y_{i+1})$$

When det=0, the line segments $v_i v_{i+1}$ and $v_j v_{j+1}$ may coincide; therefore, the coincidence should be detected before calculating the determinant det.

Equation 9 below shows the position of the point where line segment $v_i v_{i+1}$ and line segment $v_j v_{j+1}$ contact or intersect each other.

Equation 9:

$$p=((y_{j+1}-y_j)(x_i-x_j)+(x_j-x_{j+1})(y_i-y_j))/det$$

$$q=((y_{i+1}-y_i)(x_i-x_j)+(x_i-x_{i+1})(y_i-y_j))/det$$

More specifically, i and j are sequentially varied, and when $det \neq 0$, if p and q calculated by Equation 9 satisfy $0 \leq p \leq 1$ and $0 \leq q \leq 1$, respectively, the contour model intersection detecting section 4 decides that the line segments $v_i v_{i+1}$ and $v_j v_{j+1}$ is contacting or intersecting each other at a point (p, q) on the contour model, and detects the contact or intersection. Once the contact or intersection is detected, the contour model intersection detecting section 4 terminates its detection operation.

When the contact or intersection is detected, the control section 8 instructs the execution of STEP4a; otherwise, STEP5a is executed.

[STEP4a] Division of the contour model

Figure 4:
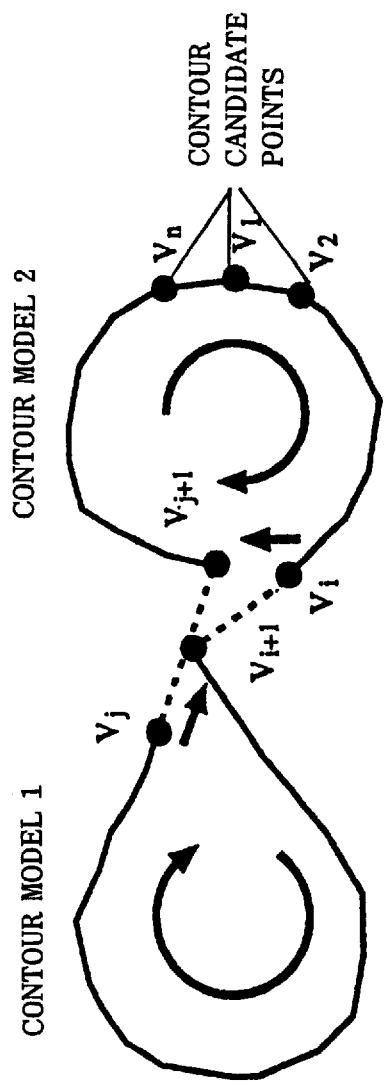
FIG. 4 is a diagram showing an example of intersection and division of a contour model.

FIG. 4 shows a typical example of the intersection that occurs when $E_{area}$ is used as the energy of the contour model. The contour model dividing section 5 divides the contour model into a plurality of parts. When the dividing operation by the contour model dividing section 5 is completed, the control section 8 returns the process to STEP2a.

The contour model dividing section 5 divides the contour model(=contour models 1 and 2 shown in FIG. 4) into contour model 1 and contour model 2 by using the line segments $v_i v_{i+1}$ and $v_j v_{j+1}$ having the intersection first detected by the contour model intersection detecting section 4. More specifically, the contour model dividing section 5 joins the contour candidate point $v_i$ having the leading number in the intersecting line segment $v_i v_{i+1}$ with the contour candidate point $v_{j+1}$ having the trailing number in the other intersecting line segment $v_j v_{j+1}$, and divides the contour model (=contour models 1 and 2) to form the contour model 2. Likewise, the contour model dividing section 5 joins the contour candidate point $v_j$ having the leading number in the intersecting line segment $v_j v_{j+1}$ with the contour candidate point $v_{i+1}$ having the trailing number in the other intersecting line segment $v_i v_{i+1}$, and divides the contour model (=contour models 1 and 2) to form the contour model 1.

As a result, the contour model (=contour models 1 and 2) is divided into two parts, one having the order of connection $\{v_1, \ldots, v_i, v_{j+1}, \ldots, v_n\}$ and the other $\{v_{i+1}, \ldots, v_j\}$.

After the above division, the control section 8 instructs the contour model intersection detecting section 4 to detect a point of contact or intersection on line segments that follow the line segment $v_i v_{i+1}$ and on which the contact or intersection detection was not performed in the previous STEP3a. In this case also, the detection operation stops when a point of contact or intersection is first detected on any one of the line segments following the line segment $v_i v_{i+1}$, and the dividing operation in STEP4a is performed over again. Such recursive processing is repeated until all line segments of the contour model (=contour models 1 and 2) have been processed.

[STEP5a] Judging whether to create or delete a contour candidate point

The contour candidate point creating/deleting section 6 creates or deletes a contour candidate point.

The contour candidate point creating/deleting section 6 creates a new contour candidate point, for example, in the following case. That is, when the distance between adjacent contour candidate points satisfies $|v_{i+1}-v_i|>D_{TH}$, the contour candidate point creating/deleting section 6 creates a new contour candidate point between the two points $v_i$ and $v_{i+1}$. Here, $D_{TH}$ is a preset maximum distance between contour candidate points. At this time, when a contour candidate point is created, the contour candidate point creating/ deleting section 6 sets $G_{flag}$ to 1; otherwise, $G_{flag}$ is set to 0.

On the other hand, the contour candidate point creating/ deleting section 6 deletes a contour candidate point, for example, in the following case. That is, the contour candidate point creating/deleting section 6 deletes a candidate point $v_i$ if it satisfies $\cos\theta > \theta_{TH}$ (where $\theta$ is the angle between $v_i v_{i-1}$ and $v_i v_{i+1}$). Here, $\theta$ is a preset threshold value with which to judge the peakedness of the contour model. At this time, when a contour candidate point was deleted, the contour candidate point creating/deleting section 6 sets $D_{flag}$ to 1; otherwise, $D_{flag}$ is set to 0.

Creation of an additional contour candidate point offsets the loss, caused by the division, in the number of contour candidate points per object, so that the contours of multiple objects can be extracted correctly.

Further, according to the above deletion method, a contour candidate point resting elsewhere than the contour of the object is deleted, and thus, erroneous contour extraction can be avoided.

[STEP6a] Extraction completion judgement

The extraction completion judging section 7 judges that the contour extraction has been completed, if all the contour points are stationary ($\forall i; F(v_i)=0$) and if there is no creation or deletion of a contour candidate point ($G_{flag}=0$ and $D_{flag}=0$).

When it is judged by the extraction completion judging section 7 that the contour extraction has been completed, the control section 8 terminates the contour extraction process; otherwise, the process returns to STEP2a.

Figure 5:
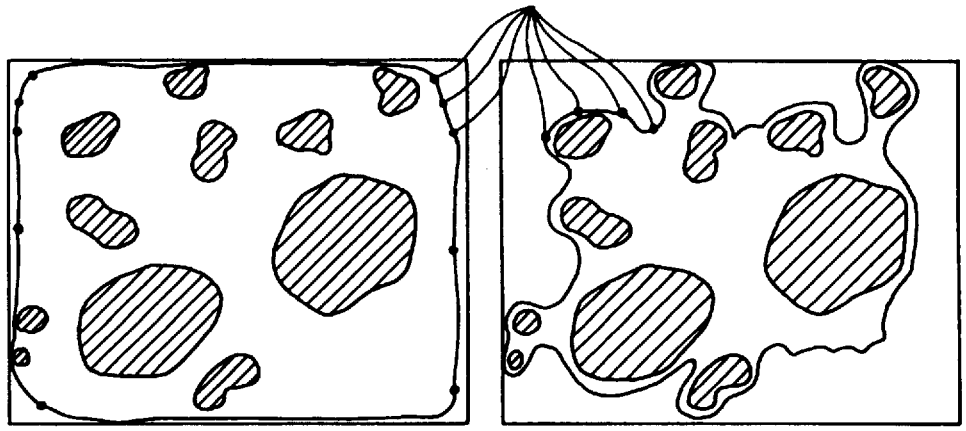
FIGS. 5(a)–5(f) are diagrams showing how the objects (cells) are extracted.
Figure 5:
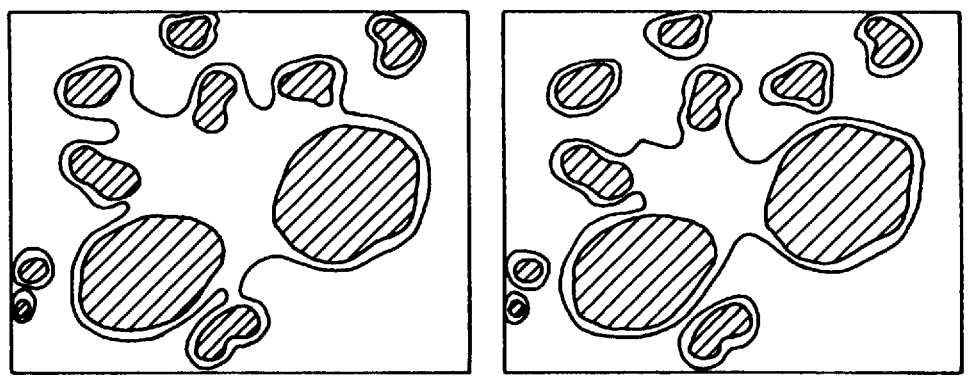
Figure 5:
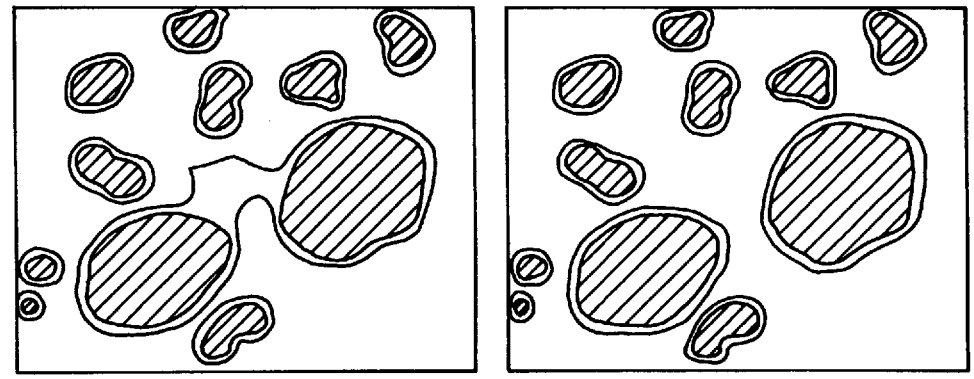

According to the above-described procedure, as shown in FIG. 5 the initial contour model (FIG. 5(a)) containing the whole set of objects (cells) sequentially undergoes intersection detection and division in the process of transformation (FIG. 5(b) to (e)) so that finally the multiple objects can be detected independently of each other (FIG. 5(f)).

As described above, according to the present embodiment, the contour model is detected for an intersection and divided into a plurality of parts; this makes it possible to automatically extract the contours of a plurality of objects in an image.

(Embodiment 2)

Next, we will describe a contour extraction apparatus according to a second embodiment of the present invention. In the description of the first embodiment, we showed that the contours of a plurality of objects contained in an image can be automatically extracted by detecting a point of intersection or contact in a contour model and by dividing the contour model into a plurality of parts. In the second embodiment, provisions are made to selectively extract only an object that satisfies a specified criterion. Such a criterion includes, for example, the size of the object. The first embodiment has been described by taking cell contour extraction as an example; it should, however, be noted that in a medical diagnosis it is often necessary to extract only cells having a specific size.

Figure 6:
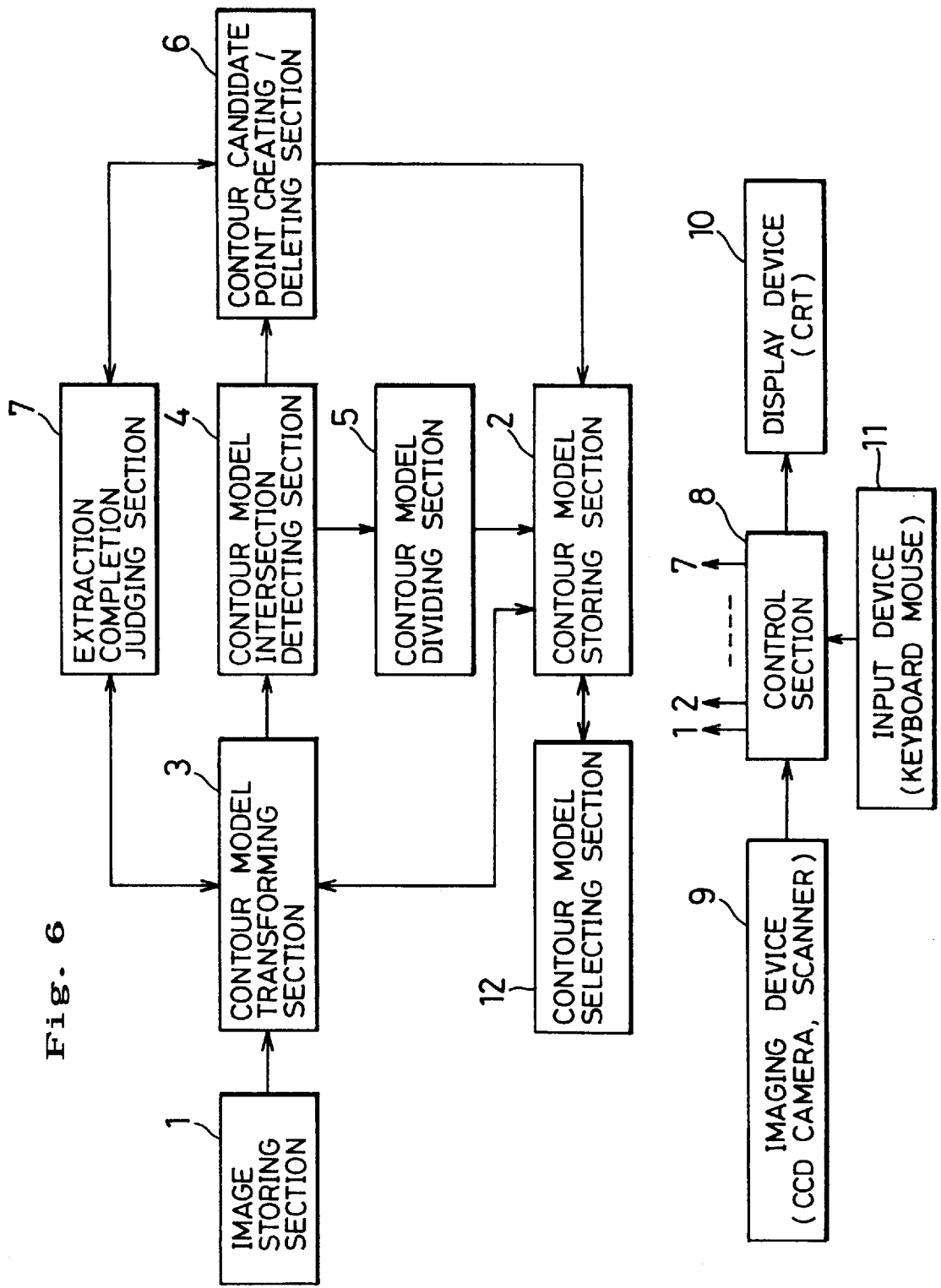
FIG. 6 is a block diagram showing a contour extraction apparatus according to a second embodiment of the present invention.

FIG. 6 shows a block diagram of this embodiment. The same constituent parts as those in the first embodiment shown in FIG. 1 are designated by the same reference numerals, and detailed explanation of such parts will not be repeated here. In contrast to the configuration of the first embodiment, the second embodiment is characterized by the including of a contour model selecting section 12 which, when at least one contour model stored in the contour model storing section 2 does not satisfy a predetermined criterion, deletes that contour model from the contour model storing section 2. This makes selective object extraction possible by taking size and other factors into account.

Figure 7:
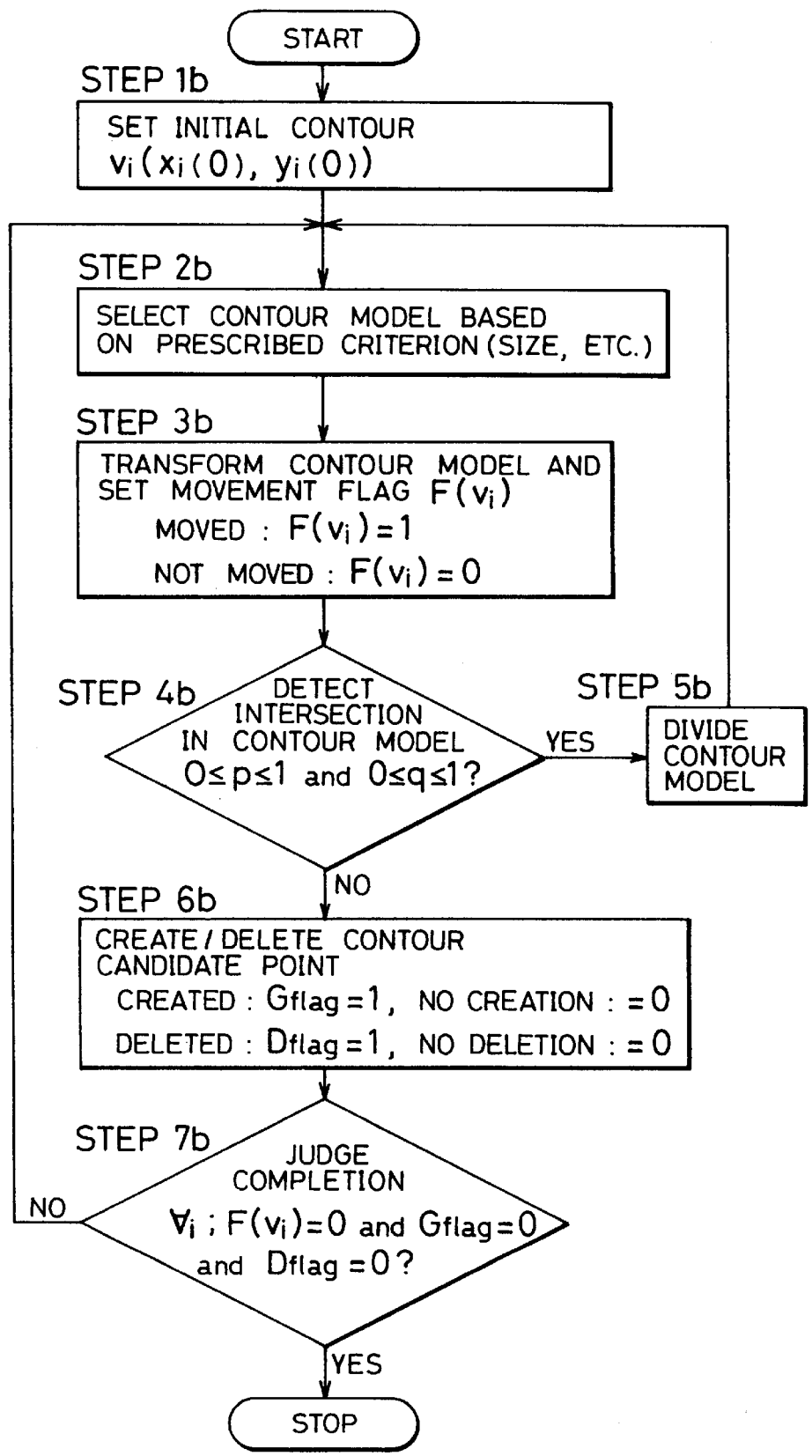
FIG. 7 is a flowchart illustrating a sequence of operations according to the second embodiment.
Figure 8:
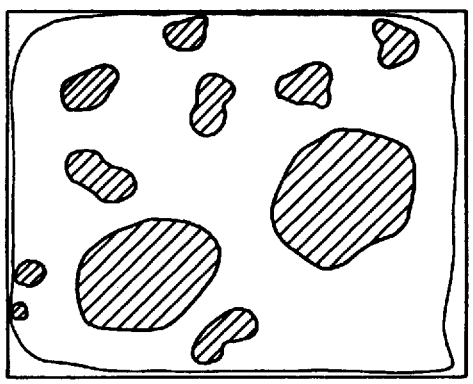
FIGS. 8(a)–8(f) are diagrams showing how the objects (cells) are extracted by considering their sizes.
Figure 8:
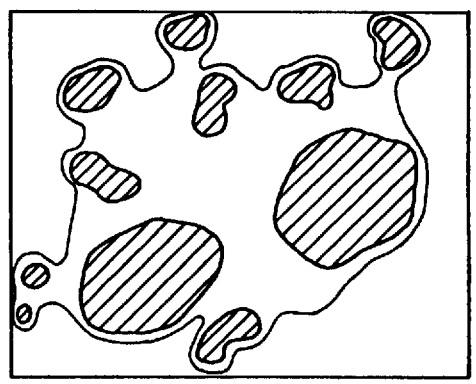
Figure 8:
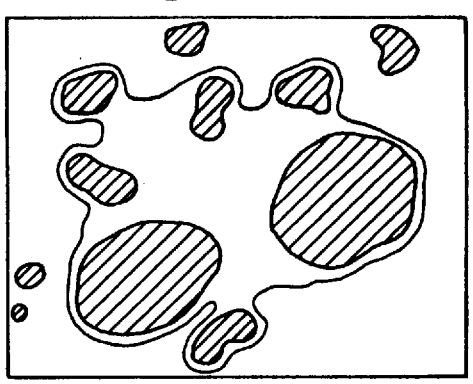
Figure 8:
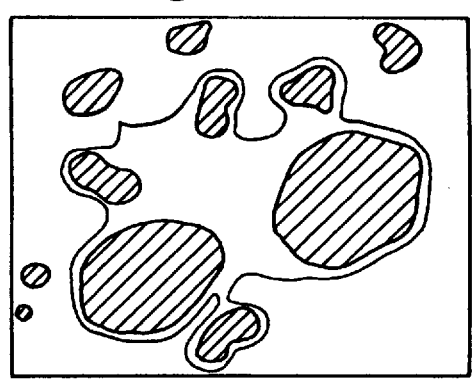
Figure 8:
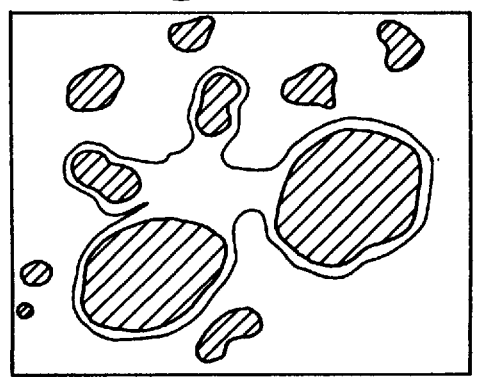
Figure 8:
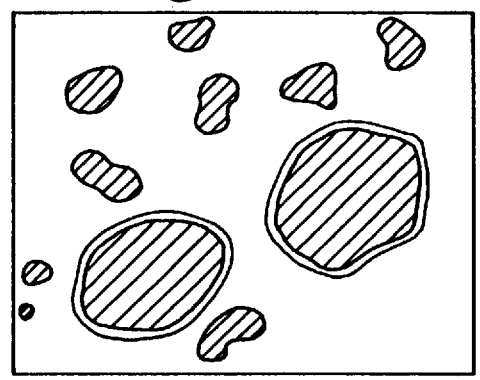

The operation of this embodiment will be described below. FIG. 7 is a flowchart illustrating the operation of the contour extraction apparatus according to this embodiment. STEP1b and STEP3b to STEP7b in this flowchart are exactly the same as STEP1a and STEP2a to STEP6a, respectively, in the first embodiment. The difference is in STEP2b which will be described below.

[STEP2b] Selection of a contour model

The contour model selecting section 12 deletes a contour model from the contour model storing section 2 if the contour model does not satisfy a predetermined criterion.

For example, a threshold value is set for $E_{area}$ in Equation 3 as the predetermined criterion. If $E_{area}$ of a contour model is less than the threshold value, the contour model is deleted from the contour model storing section 2.

By repeating this process, those contour models whose areas are smaller than the specified value are sequentially deleted, as shown in FIGS. 8(a)–8(f) finally leaving for extraction only relatively large cells located in the center of the image.

As described above, according to this embodiment, when contour extraction has been completed for each object, or when contour extraction has been completed for all of the objects, the area ($E_{area}$) of the closed region enclosed by each contour model is calculated, and any contour model smaller than a prescribed area, larger than a prescribed area, lying within a range of a prescribed area, or lying outside the range of a prescribed area, is deleted. This makes it possible to extract only objects having a desired size.

(Embodiment 3)

Next, we will describe a contour extraction apparatus according to a third embodiment of the present invention. The description of the first and second embodiments have dealt with the extraction of a plurality of stationary objects. By contrast, the third embodiment is concerned with the extraction of a plurality of moving objects. The basic principle is that the presence or absence of edge motion is detected and only edges with motion are connected smoothly using a contour model, to extract a moving object.

More specifically, motion vectors are obtained using a plurality of images sequentially captured in time series. In transforming a contour model, if the magnitude of a motion vector at the position of a contour candidate point on the contour model is less than the moving speed (for example, one pixel per frame) of the object to be extracted, the weighting factor (for example, $W_{edge}$) for image energy (for example, $E_{edge}$) is set to 0 for that point. In this way, the contour model can be drawn only toward moving edges, and by smoothly connecting these moving edges, the contours of a plurality of moving objects can be extracted.

Figure 9:
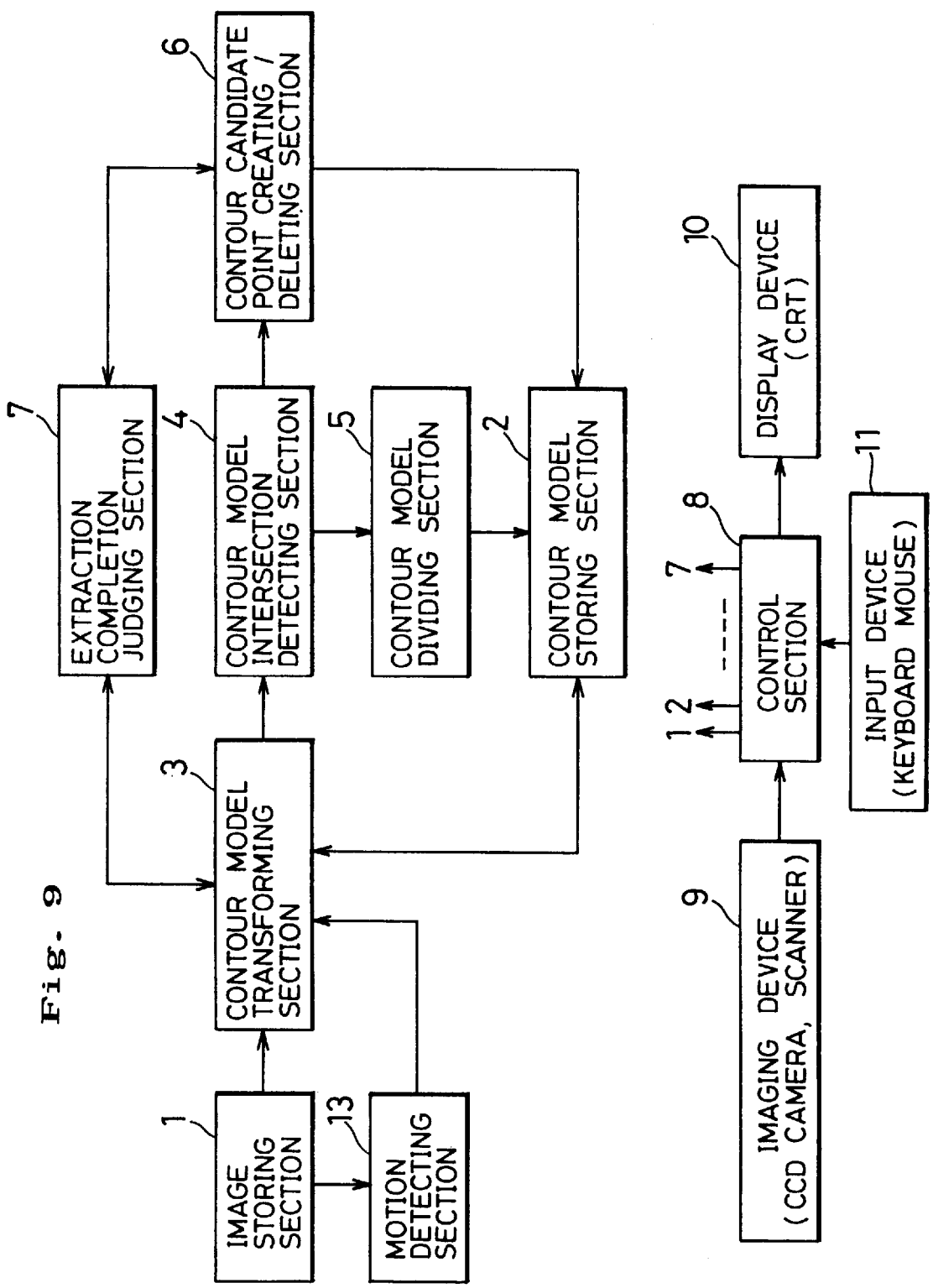
FIG. 9 is a block diagram showing a contour extraction apparatus according to a third embodiment of the present invention.

FIG. 9 shows a block diagram of this embodiment. The same constituent parts as those in the first embodiment shown in FIG. 1 are designated by the same reference numerals, and detailed explanation of such parts will not be repeated here. In contrast to the configuration of the first embodiment, the third embodiment is characterized by the including of a motion detecting section 13 for extracting motion from a plurality of images sequentially captured in time series. The plurality of images sequentially captured are stored in the image storing section 1.

Figure 10:
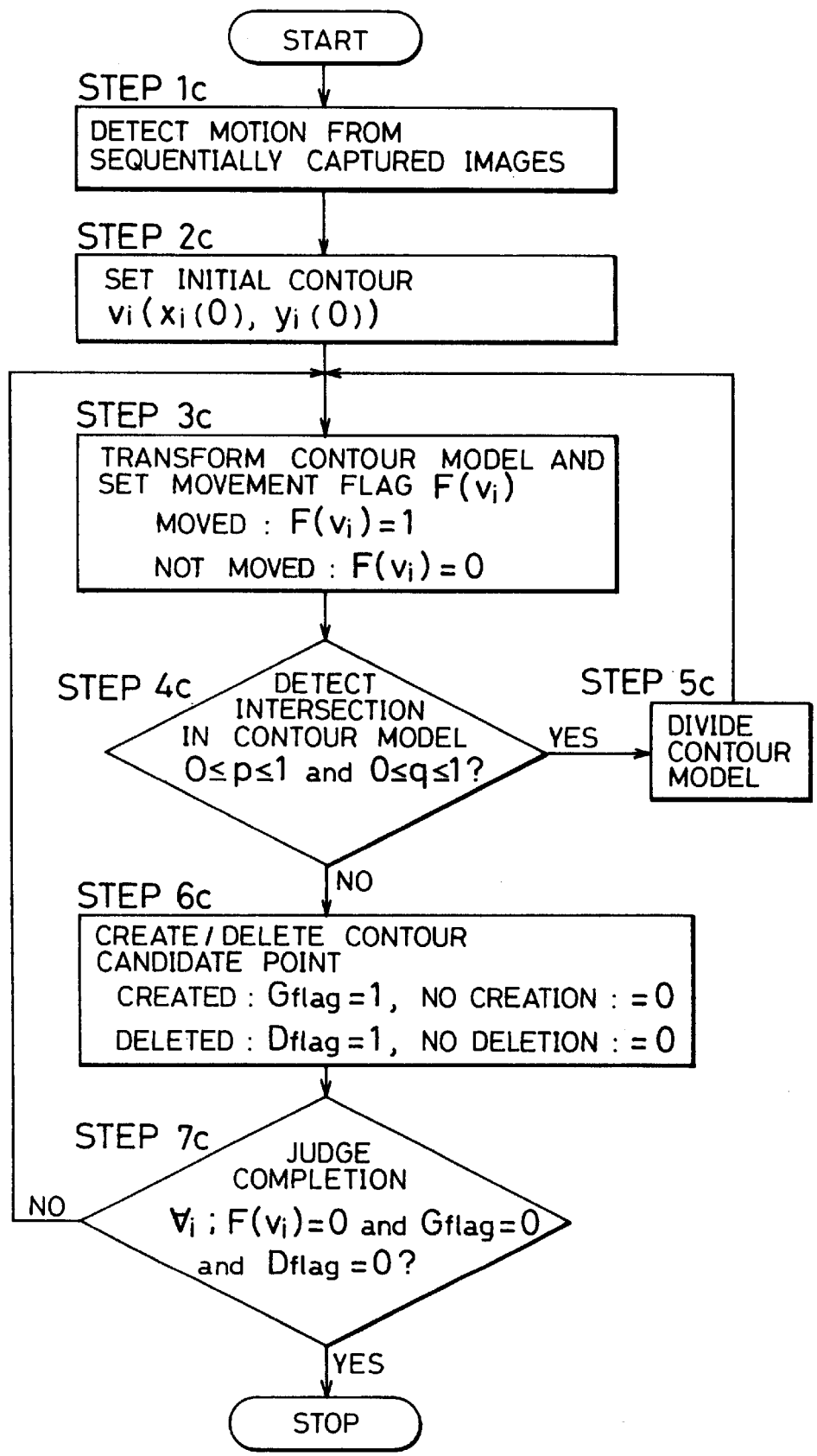
FIG. 10 is a flowchart illustrating a sequence of operations according to the third embodiment.
Figure 11:
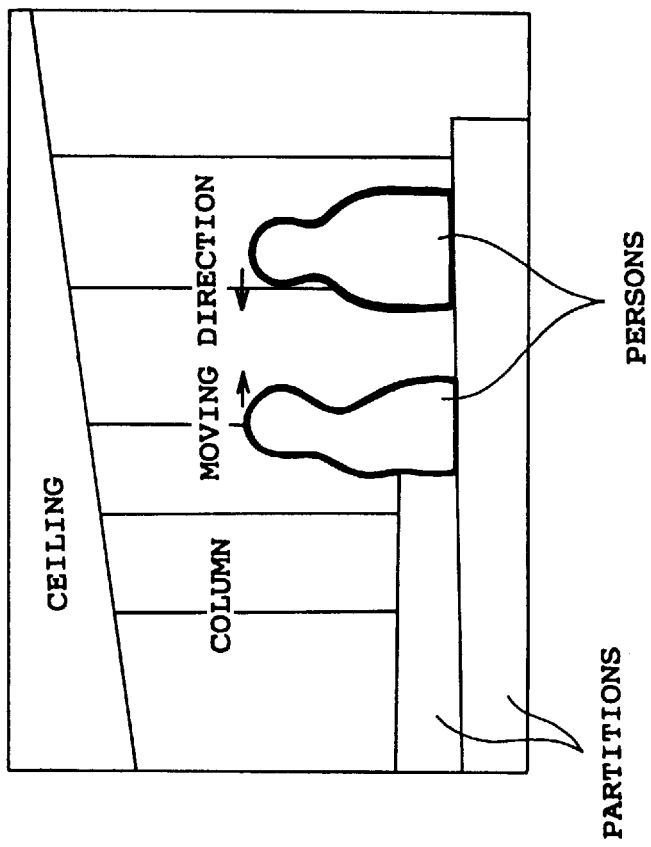
FIG. 11 is a diagram showing an example of an image containing moving objects (walking persons)

Next, the operation of this embodiment will be described. FIG. 10 is a flowchart illustrating the operation of the contour extraction apparatus according to this embodiment. STEP2c and STEP4c to STEP7c in this flowchart are respectively the same as STEP1a and STEP3a to STEP6a in the first embodiment. Only differences are in STEP1c and STEP3c, which will be described below. In this embodiment, persons walking in a room as shown in FIG. 11 are extracted as moving objects.

[STEP1c] Motion detection

The motion detecting section 13 detects a motion vector from the plurality of images stored in the image storing section 1.

For example, the motion detecting section 13 obtains a motion vector using the method of least squares, based on the gradient method. In the gradient method, partial derivatives of image brightness I(x, y) with respect to time and space and the following constraint equation relating to an object's apparent speed (u, v)=(dx/dt, dy/dt) are used.

Equation 10:

$$Ix(x,y)u+Iy(x,y)v+It(x,y)=0$$

where $Ix=\partial I/\partial x, Iy=\partial I/\partial y$, and $It=\partial I/\partial t$ Here, assuming that the motion vector is the same in a small local region in an image, that is, the constraint equation expressed by Equation 10 has the same solution in a small local region S, the motion vector can be obtained as (u, v) that minimizes Equation 11 below.

Equation 11:

$$E=\Sigma(Ix(i,j)u+Iy(i,j)v+It(i,j))^2 (i,j)\in S$$

Therefore, (u, v) that satisfies $\partial E/\partial u=0$ and $\partial E/\partial v=0$ should be obtained by Equation 12 below.

Equation 12:

$$u=(\Sigma Ixly\cdot\Sigma Itly-\Sigma(Iy)^2\cdot\Sigma Itlx)/Det$$

$$v=(\Sigma Ixly\cdot\Sigma Itlx-\Sigma(Ix)^2\cdot\Sigma Itly)/Det$$

where Ix, Iy, It are Ix(i, j), Iy(i, j), It(i, j) respectively, as shown in Equation 11, i, j are the x, y coordinates of pixels belonging to the small region S in the image, and $\Sigma$ is calculated for $(i,j)\in S$. Further, Det is calculated by the following equation.

Equation 13:

$$Det=\Sigma(Iy)^2\cdot\Sigma(Ix)^2-(\Sigma Ixly)^2$$

[STEP3c] Transformation of the contour model

The contour model transforming section 3 moves the positions of all the contour candidate points once. At this time, for a position where motion was not detected in STEP1c, the weighting factor $W_{edge}$ in $E_{edge}$ is set to 0. The effect of this is that the contour model is drawn only toward the edges where motion was detected.

Figure 12:
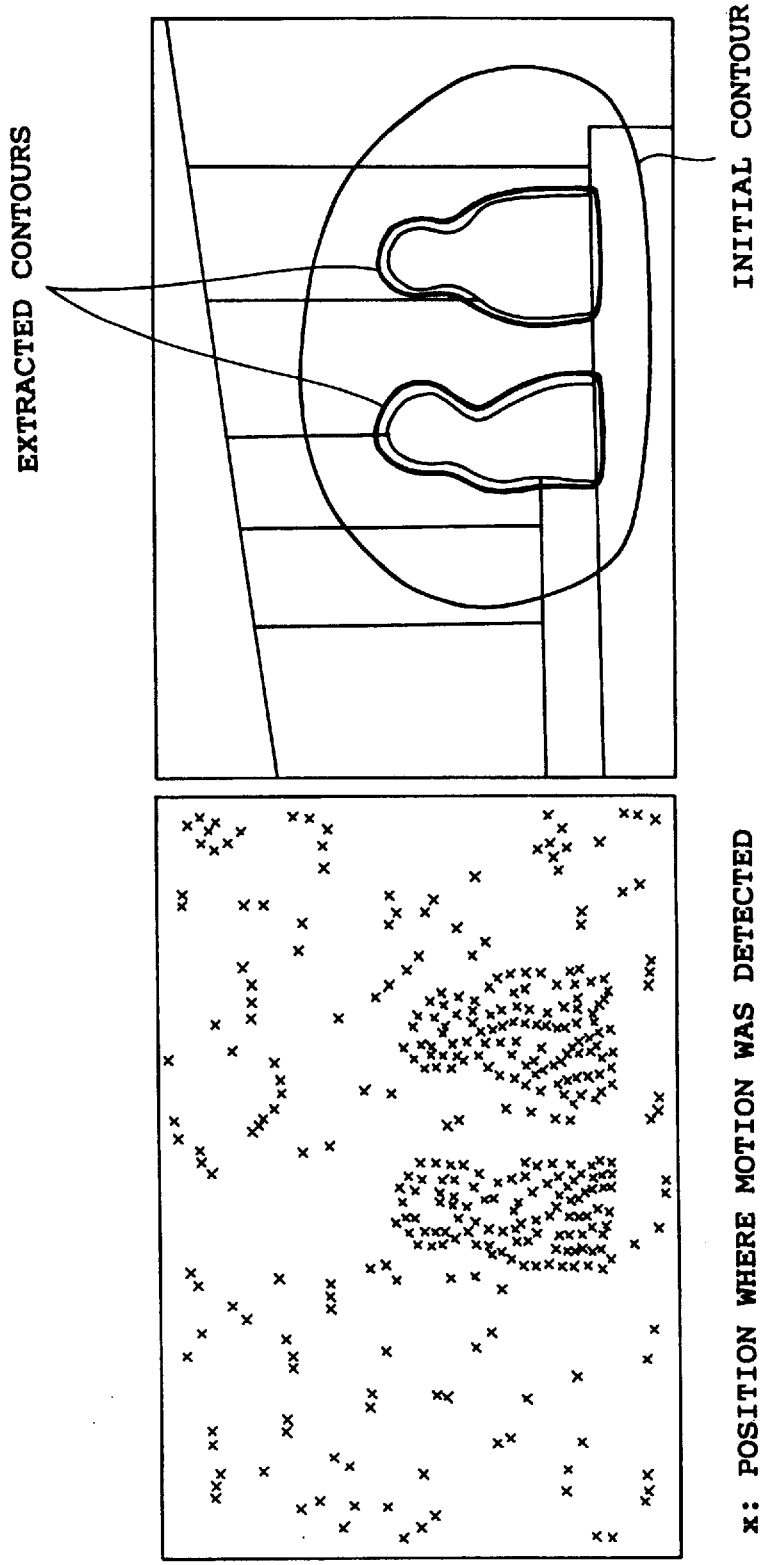
FIGS. 12(a) and 12(b) are diagrams showing a result of motion detection and a result of the extraction of the moving objects (walking persons)

According to the above procedure, as shown in FIGS. 12(a) and 12(b), by detecting motion using the gradient method (FIG. 12(a)), and by setting the weighting factor $W_{edge}$ in $E_{edge}$ for every position where motion was not detected when moving the contour candidate points, the contour model can be drawn only toward the edges where motion was detected. In this way, the contour extraction apparatus of this embodiment can extract a plurality of moving objects, for example, walking persons (FIG. 12(b)).

As described above, according to the present embodiment, a plurality of moving objects can be extracted by detecting motion from a plurality of images captured sequentially and by smoothly connecting only moving edges.

(Embodiment 4)

Next, we will describe a contour extraction apparatus according to a fourth embodiment of the present invention. The first to third embodiments have dealt with apparatus for extracting objects from visible images captured by a CCD camera and the like. However, it is often difficult to extract objects such as human bodies by relying only on visible image information. The fourth embodiment is concerned with an apparatus that uses thermal images captured by an infrared camera, and that can extract a heat generating object such as a human body and yet can distinguish a human body from stationary heat-generating apparatus such as a personal computer CRT.

Figure 13:
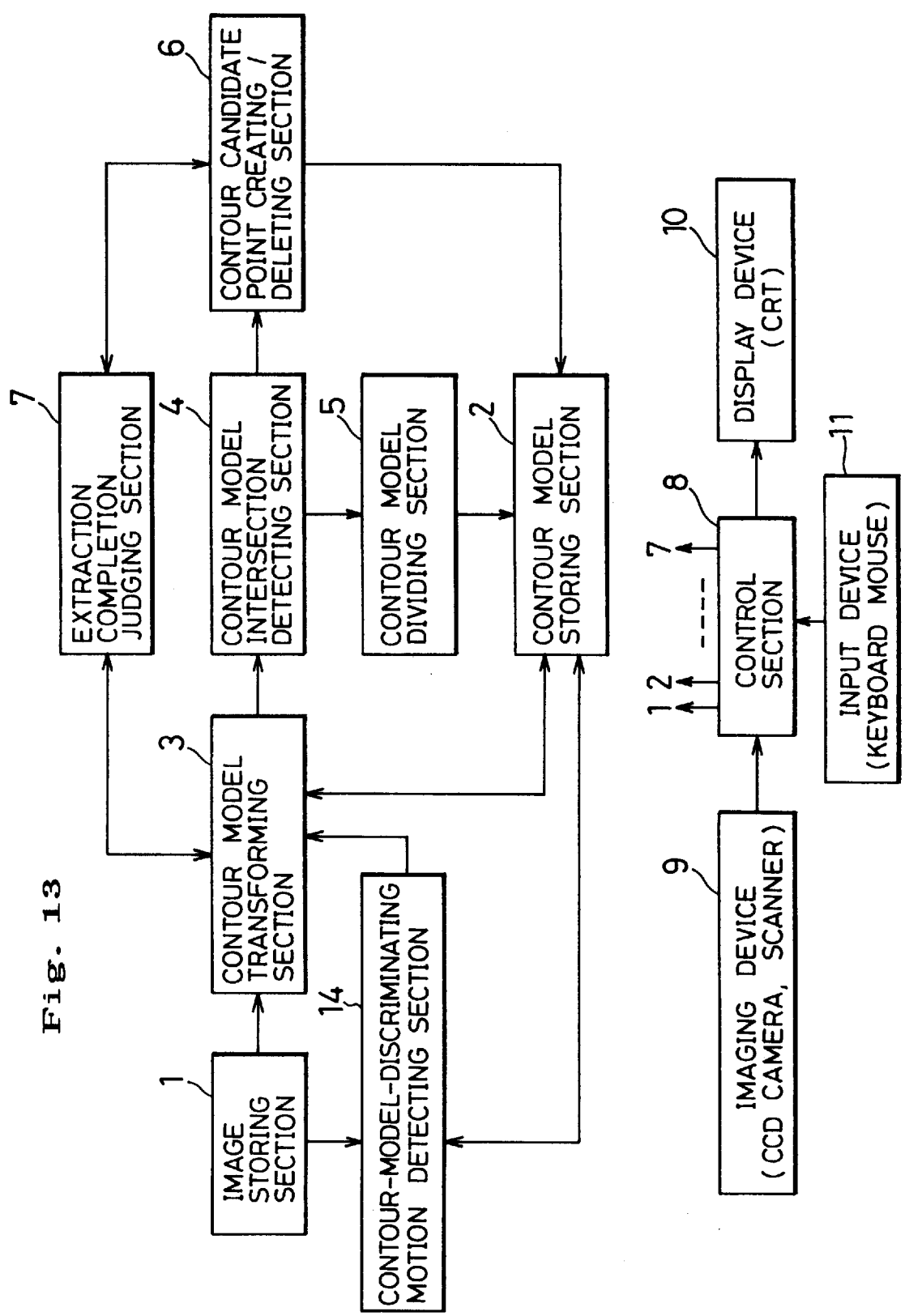
FIG. 13 is a block diagram showing a contour extraction apparatus according to a fourth embodiment of the present invention.

FIG. 13 shows a block diagram of this embodiment. The same constituent parts as those in the first embodiment shown in FIG. 1 are designated by the same reference numerals, and detailed explanation of such parts will not be repeated here. In contrast to the configuration of the first embodiment, the fourth embodiment is characterized by the including of a contour-model-discriminating motion detecting section 14 for detecting motion in the vicinity of the contour candidate points stored in the contour model storing section 2. A plurality of thermal images sequentially captured in time series are stored in the image storing section 1.

With this configuration, a contour model for which motion was detected can be determined as a contour model of a human body and thus, can be distinguished from a contour model of a stationary heat-generating apparatus.

Figure 14:
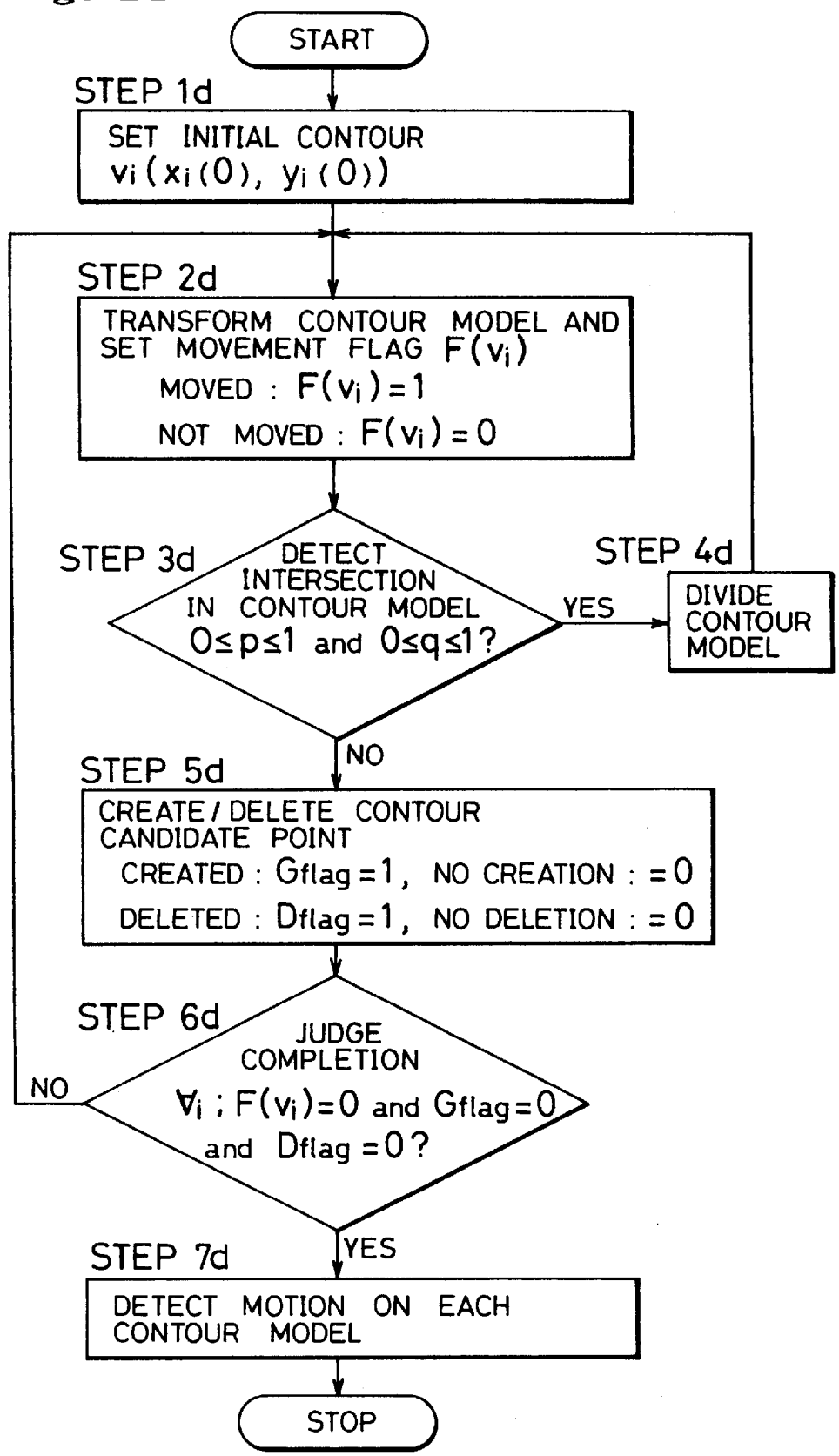
FIG. 14 is a flowchart illustrating a sequence of operations according to the fourth embodiment.

Next, the operation of this embodiment will be described. FIG. 14 is a flowchart illustrating the operation of the contour extraction apparatus according to this embodiment. STEP1d to STEP6d in this flowchart are exactly the same as STEP1a to STEP6a, respectively, in the first embodiment. The difference is in STEP7d which will be described below.

[STEP7d] Motion detection on each contour model

The contour-model-discriminating motion detecting section 14 detects motion in the vicinity of the contour candidate points forming at least one contour model for which it is judged in STEP6d that the extraction has been completed.

Motion may be detected using, for example, the gradient method used in the third embodiment. When motion is detected on a predetermined number of contour candidate points for a contour model, then the contour model is judged as representing a moving heat-generating object (for example, a human body).

Figure 15:
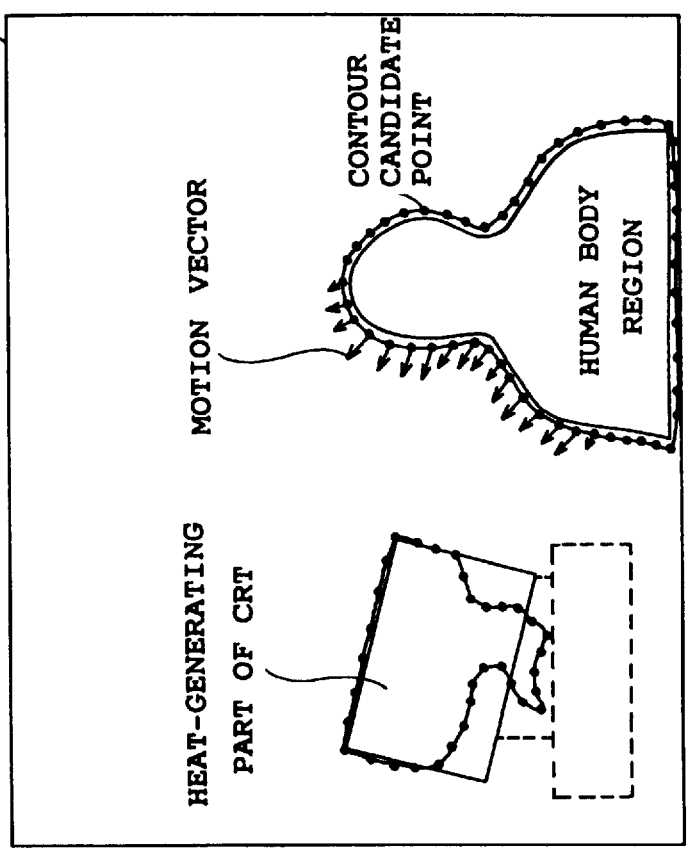
FIG. 15 is a diagram showing the result of a process for distinguishing between a human body and a heat-generating apparatus.

According to the above procedure, by detecting motion on each contour model, a human body can be distinguished from a stationary heat-generating apparatus, as shown in FIG. 15.

As described above, according to the fourth embodiment, motion is detected on each contour model by using a plurality of thermal images sequentially captured in time series. This makes it possible to distinguish a human body from a stationary heat-generating apparatus.

According to the first embodiment of the invention, by detecting an intersection in a contour model and by dividing the contour model into a plurality of parts, the contours of a plurality of objects in an image can be automatically extracted. This can achieve, for example, an automatic image editing apparatus that does not require human intervention.

According to the second embodiment of the invention, by deleting contour models that do not satisfy a prescribed criterion, only objects of a prescribed size, for example, can be extracted. This can be applied, for example, to an automated system for a medical diagnosis where cells of a specified size are examined.

According to the third embodiment of the invention, by detecting motion from a plurality of sequentially captured images, and by smoothly connecting moving edges only, a plurality of moving objects can be extracted. For example, only humans walking in a room can be extracted. This, therefore, can be applied to air conditioning or like control adaptable to changes in human activity.

According to the fourth embodiment of the invention, by detecting motion on each contour model from a plurality of sequentially captured thermal images, a human body can be distinguished from a stationary heat-generating apparatus. This can achieve meticulous air conditioning control adaptable to the conditions of room occupants, for example, by directing an air outlet toward a position where a human body is detected.

What is claimed is:

1. A contour extraction apparatus comprising:
   an image storing section for storing an image;
   a contour model storing section for storing a contour model in the form of an ordered set of directed line segments that encloses at least one object contained in said image, each line segment being an ordered set of two points;
   a contour model transforming section for transforming said contour model according to a prescribed rule;
   a contour model intersection detecting section for detecting a contact or intersection of line segments in the transformed contour model by determining a point of intersection lying on two of the directed line segments free of following the edge of the contour model; and
   a contour model dividing section for dividing said contour model into a plurality of contour models on the basis of the contact or intersection thus detected.

2. A contour extraction apparatus comprising:
   an image storing section for storing an image;
   a contour model storing section for storing a contour model in the form of an ordered set of directed line segments that encloses at least one object contained in said image, each line segment being an ordered set of two points;
   a contour model transforming section for transforming said contour model according to a prescribed rule;
   a contour model intersection detecting section for detecting a contact of line segments in the transformed contour model by determining a point of contact of two of the directed line segments; and
   a contour model dividing section for dividing said contour model into a plurality of contour models on the basis of the contact thus detected.

3. A contour extraction apparatus according to claims 1 or 2, wherein said contour model storing section stores a plurality of contour candidate points for forming said contour model and an order in which the contour candidate points are to be connected.

4. A contour extraction apparatus according to claim 3, wherein the plurality of contour candidate points and the order of their connection stored in said contour model storing section are updated into a plurality of contour candidate points and an order of their connection for each of a plurality of different contour models resulting from the division in said contour model dividing section.

5. A contour extraction apparatus according to claim 4, wherein said contour model transforming section transforms and shrinks said contour model by moving or stopping each of the plurality of contour candidate points of the contour model.

6. A contour extraction apparatus according to claim 4, further comprising a contour model creating/deleting section for, when a prescribed criterion is satisfied, adding a new contour candidate point to said contour model and/or deleting at least one contour candidate point on the contour model.

7. A contour extraction apparatus according to claim 4, further comprising a contour model selecting section for, when any of the plurality of different contour models resulting from the division in said contour model dividing section does not satisfy a prescribed criterion, deleting any such contour models from the contour model storing section.

8. A contour extraction apparatus according to claim 4, wherein said image storing section stores in addition to said image at least one different image continuing from the image at a prescribed time interval,
   said contour extraction apparatus further comprising a motion detecting section for detecting a motion vector on the basis of the plurality of successive images stored in said image storing section.

9. A contour extraction apparatus according to claim 4, wherein said image storing section stores a plurality of images continuing one after another at a prescribed time interval,
   said contour extraction apparatus further comprising a contour-model-discriminating motion detecting section for detecting a motion vector for at least one of said plurality of images within a prescribed range of each of the contour candidate points forming a contour model of at least one object extracted by said contour extraction apparatus.

10. A contour extraction apparatus according to claim 3, wherein said contour model transforming section transforms and shrinks said contour model by moving or stopping each of the plurality of contour candidate points of the contour model.

11. A contour extraction apparatus according to claim 10, further comprising a contour model creating/deleting section for, when a prescribed criterion is satisfied, adding a new contour candidate point to said contour model and/or deleting at least one contour candidate point on the contour model.

12. A contour extraction apparatus according to claim 10, further comprising a contour model selecting section for, when any of the plurality of different contour models resulting from the division in said contour model dividing section does not satisfy a prescribed criterion, deleting any such contour models from the contour model storing section.

13. A contour extraction apparatus according to claim 10, wherein said image storing section stores in addition to said image at least one different image continuing from the image at a prescribed time interval,
   said contour extraction apparatus further comprising a motion detecting section for detecting a motion vector on the basis of the plurality of successive images stored in said image storing section.

14. A contour extraction apparatus according to claim 10, wherein said image storing section stores a plurality of images continuing one after another at a prescribed time interval,
   said contour extraction apparatus further comprising a contour-model-discriminating motion detecting section for detecting a motion vector for at least one of said plurality of images within a prescribed range of each of the contour candidate points forming a contour model of at least one object extracted by said contour extraction apparatus.

15. A contour extraction apparatus according to claim 3, further comprising a contour model creating/deleting section for, when a prescribed criterion is satisfied, adding a new contour candidate point to said contour model and/or deleting at least one contour candidate point on the contour model.

16. A contour extraction apparatus according to claim 15, further comprising a contour model selecting section for, when any of the plurality of different contour models resulting from the division in said contour model dividing section does not satisfy a prescribed criterion, deleting any such contour models from the contour model storing section.

17. A contour extraction apparatus according to claim 15, wherein said image storing section stores in addition to said image at least one different image continuing from the image at a prescribed time interval, said contour extraction apparatus further comprising a motion detecting section for detecting a motion vector on the basis of the plurality of successive images stored in said image storing section.

18. A contour extraction apparatus according to claim 15, wherein said image storing section stores a plurality of images continuing one after another at a prescribed time interval, said contour extraction apparatus further comprising a contour-model-discriminating motion detecting section for detecting a motion vector for at least one of said plurality of images within a prescribed range of each of the contour candidate points forming a contour model of at least one object extracted by said contour extraction apparatus.

19. A contour extraction apparatus according to claim 3, further comprising a contour model selecting section for, when any of the plurality of different contour models resulting from the division in said contour model dividing section does not satisfy a prescribed criterion, deleting any such contour models from the contour model storing section.

20. A contour extraction apparatus according to claim 19, wherein said image storing section stores in addition to said image at least one different image continuing from the image at a prescribed time interval, said contour extraction apparatus further comprising a motion detecting section for detecting a motion vector on the basis of the plurality of successive images stored in said image storing section.

21. A contour extraction apparatus according to claim 19, wherein said image storing section stores a plurality of images continuing one after another at a prescribed time interval, said contour extraction apparatus further comprising a contour-model-discriminating motion detecting section for detecting a motion vector for at least one of said plurality of images within a prescribed range of each of the contour candidate points forming a contour model of at least one object extracted by said contour extraction apparatus.

22. A contour extraction apparatus according to claim 3, wherein said image storing section stores in addition to said image at least one different image continuing from the image at a prescribed time interval, said contour extraction apparatus further comprising a motion detecting section for detecting a motion vector on the basis of the plurality of successive images stored in said image storing section.

23. A contour extraction apparatus according to claim 3, wherein said image storing section stores a plurality of images continuing one after another at a prescribed time interval, said contour extraction apparatus further comprising a contour-model-discriminating motion detecting section for detecting a motion vector for at least one of said plurality of images within a prescribed range of each of the contour candidate points forming a contour model of at least one object extracted by said contour extraction apparatus.

24. A contour extraction apparatus according to claims 1 or 2, wherein said image storing section stores in addition to said image at least one different image continuing from the image at a prescribed time interval, said contour extraction apparatus further comprising a motion detecting section for detecting a motion vector on the basis of the plurality of successive images stored in said image storing section.

25. A contour extraction apparatus according to claims 1 or 2, wherein said image storing section stores a plurality of images continuing one after another at a prescribed time interval, said contour extraction apparatus further comprising a contour-model-discriminating motion detecting section for detecting a motion vector for at least one of said plurality of images within a prescribed range of each of the contour candidate points forming a contour model of at least one object extracted by said contour extraction apparatus.

26. The contour extraction apparatus of claim 1, wherein the contour model dividing section divides said contour model into a plurality of new ordered sets of line segments in which points are reconnected thereby to reform line segments.

* * * * *